(12) United States Patent
Criel et al.

(10) Patent No.: US 8,720,732 B2
(45) Date of Patent: May 13, 2014

(54) PLASTIC FUEL TANK WITH INCREASED DEFORMATION STABILITY

(75) Inventors: Bjorn Criel, Sint-Martens-Lennik (BE); Vincent Cuvelier, Brussels (BE); Jules-Joseph Van Schaftingen, Wavre (BE); Benoit Devaux, Brussels (BE)

(73) Assignee: Inergy Automotive Systems Research (SociétéAnonyme), Brussels (BE)

( * ) Notice: Subject to any disclaimer, the term of this patent is extended or adjusted under 35 U.S.C. 154(b) by 41 days.

(21) Appl. No.: 13/505,555

(22) PCT Filed: Oct. 27, 2010

(86) PCT No.: PCT/EP2010/066224
§ 371 (c)(1),
(2), (4) Date: May 2, 2012

(87) PCT Pub. No.: WO2011/054709
PCT Pub. Date: May 12, 2011

(65) Prior Publication Data
US 2012/0223084 A1 Sep. 6, 2012

Related U.S. Application Data

(60) Provisional application No. 61/258,703, filed on Nov. 6, 2009.

(30) Foreign Application Priority Data

Nov. 6, 2009 (EP) ..................................... 09175263

(51) Int. Cl.
*B60P 3/00* (2006.01)

(52) U.S. Cl.
USPC ........................... 220/564; 220/563; 220/4.14

(58) Field of Classification Search
USPC ........... 220/564, 563, 562, 555, 560.03, 4.14, 220/4.13, 4.12, 4.05, 553, 501, 605, 606, 220/608, 680, 678, 677, 675, 669; 137/576
See application file for complete search history.

(56) References Cited

U.S. PATENT DOCUMENTS

| | | | |
|---|---|---|---|
| 3,919,373 A | 11/1975 | Kormendi | |
| 4,453,564 A * | 6/1984 | Bergesio | ........................ 137/574 |
| 4,526,286 A | 7/1985 | Jung et al. | |
| 4,891,000 A | 1/1990 | Ishii | |

(Continued)

FOREIGN PATENT DOCUMENTS

| | | |
|---|---|---|
| EP | 0086425 A1 | 8/1983 |
| EP | 0775606 A2 | 5/1997 |

*Primary Examiner* — Jacob K Ackun
*Assistant Examiner* — Allan Stevens
(74) *Attorney, Agent, or Firm* — Oblon, Spivak, McClelland, Maier & Neustadt, L.L.P.

(57) ABSTRACT

A plastic fuel tank including an upper wall, a lower wall and at least two compartments, such compartments being established by a dividing wall including a part of the tank upper and lower walls, this dividing wall having at least opening enabling free flow of liquids between the at least two compartments and at least opening enabling free flow of vapors between the at least two compartments, such openings occupying less than 80% of the dividing wall, the at least 20% remaining of the dividing wall being constituted by at least one kiss point formed by welding together a multiplicity of contact points of the upper and lower walls.

9 Claims, 7 Drawing Sheets

(56) References Cited

U.S. PATENT DOCUMENTS

| | | |
|---|---|---|
| 5,398,839 A | 3/1995 | Kleyn |
| 2002/0100759 A1 | 8/2002 | Schmidt et al. |
| 2009/0134175 A1* | 5/2009 | Bleuel et al. .................. 220/564 |

* cited by examiner

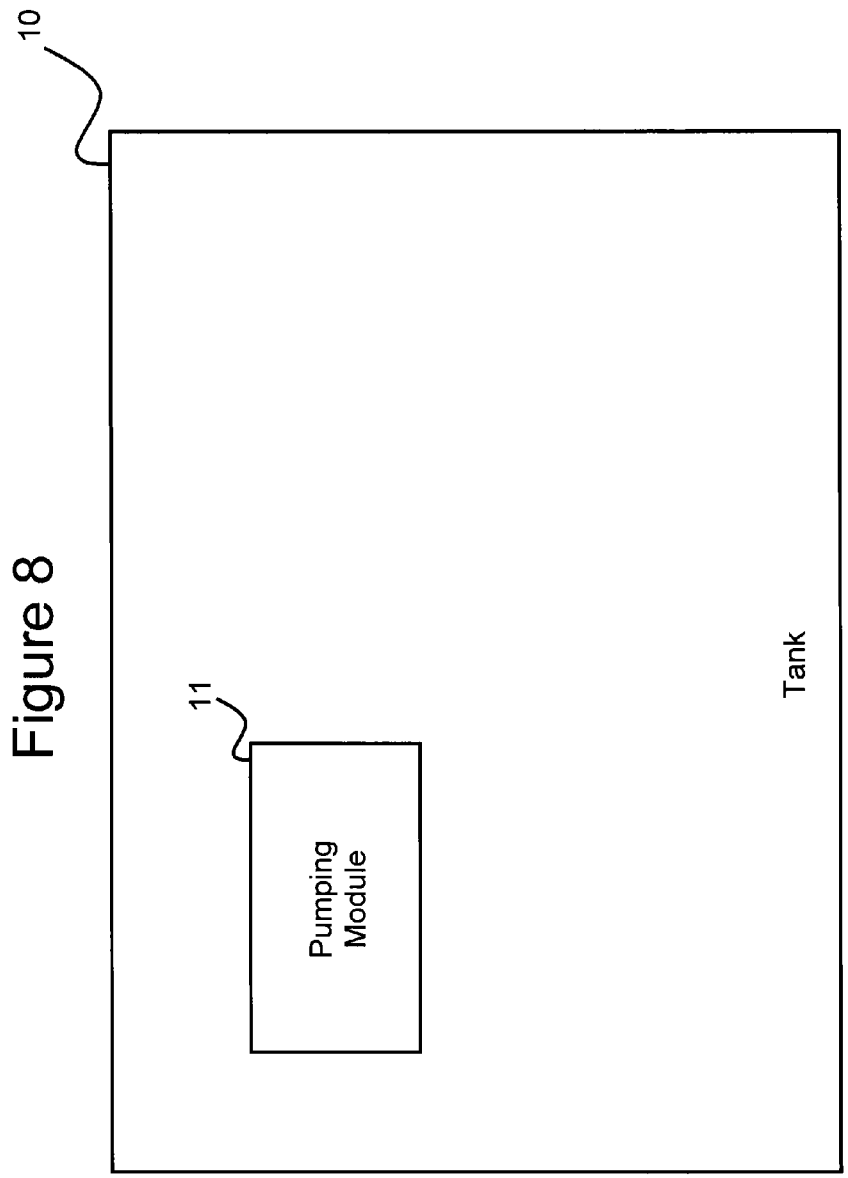

PLASTIC FUEL TANK WITH INCREASED DEFORMATION STABILITY

CROSS-REFERENCE TO RELATED APPLICATIONS

This application is a U.S. national stage entry under 35 U.S.C. §371 of International Application No. PCT/EP2010/066224 filed Oct. 27, 2010, which claims priority to U.S. provisional application No. 61/258,703 filed on Nov. 6, 2009 and to European application No. 09175263.4 filed on Nov. 6, 2009, the whole content of each of these applications being incorporated herein by reference for all purposes.

TECHNICAL FIELD OF THE INVENTION

The instant invention relates to a plastic fuel tank with increased deformation stability.

BACKGROUND OF THE INVENTION

Plastic fuel tanks intended for motor vehicles have to meet specifications that specify maximum permissible amplitudes of deformation on their lower and upper skins. The deformations stated in these specifications usually have to be met during aging test in which the tank contains a certain quantity of fuel for a given period of time (typically several weeks) and at a given temperature (usually 40° C.). The purpose of these specifications is to ensure that vehicles maintain their road clearance and to prevent the skin of the tank from coming into contact with hot spots of the vehicle and with the chassis.

At the present time, plastic fuel tanks are generally fixed to the chassis of the vehicle via plastic lags eventually supported by metal straps. Additionally a few contact points with the car chassis are foreseen. The latter are used in particular on the larger tanks where compliance with maximum permissible deformations is more difficult. However, recourse to these straps involves an additional attachment step and is therefore not very economical.

Recently, a new category of vehicle has been introduced to the market, which uses both electricity and internal combustion to propel itself. This group of vehicles has been called "hybrid" vehicles. Although these vehicles make up only a small portion of the global automotive market, their market share increases each year. A new derivation of the hybrid uses electricity only for the first 40 to 60 miles of a given journey assuming the vehicle was plugged into electrical power for a predetermined amount of time before the journey. These vehicles are deemed "plug-in hybrids".

Typically, fuel vapors are generated inside of a fuel tank due to fuel pressure and temperature variations and are stored in a charcoal canister to prevent evaporative emissions of hydrocarbons into the atmosphere. These vapors are periodically purged out of the canister and sent to the engine where they are consumed during the normal combustion process. On a standard gasoline engine vehicle this can occur whenever possible to prevent the canister from becoming stuffed and bleeding hydrocarbons into the environment. Generally these purging periods and associated purge volumes are limited on a hybrid vehicle and when the vehicle is operating in electric mode no purging at all can occur. A "plug-in hybrid" vehicle may go many driving circles without ever running the gasoline engine. Therefore, a need arises for the fuel system to contain vapor for long periods of time by keeping the system sealed and under pressure in order to limit fuel evaporation.

There are several solutions to limit the loading with vapors of the carbon canister. One of these solutions is to seal the tank. This will pressurize the tank because vapor generation is highly related to the pressure inside the fuel tank. Vapor formation leads to a build-up of a pressure up to a certain equilibrium point where basically no more vapor is formed. It is generally assumed that no more vapor generation occurs after a pressure of 30 to 45 kPa has been built up. Thus, a tank pressurized with pressure from approximately 20 kPa to approximately 50 kPa will significantly reduce the loading with fuel vapors of the carbon canister.

The presently used plastic fuel tanks are generally not designed for an internal pressure above 10 kPa without showing a significant deformation. However, the specifications to be met for deformation of the tank walls are very narrow, so that it is important to avoid an increase in deformation.

A well known technique to improve the deformation stability of hollow plastic bodies is to use a so-called kiss point or tack-off point, like described in U.S. 2002/0100759. The principle of this technique is to locally connect the upper and lower walls of the tank through weld points/areas. The main draw back of this technique is that since the kiss points are of small size in order to limit the loss of useful volume of the hollow body, they lead to the concentration of mechanical stress at aid kiss points, which may lead to cracks or other damages over time.

Solutions have been proposed in the prior art to enhance the mechanical strength of fuel tanks.

Thus, it has been proposed in U.S. Pat. Nos. 3,919,373 and 4,891,000 that an insert be secured inside the tank at the time of its blow-molding from a cylindrical peruse. However, it is not easy to position the insert accurately using this technique, which makes the blow-molding process more difficult and more costly and time consuming.

U.S. Pat. No. 5,398,839 discloses a fuel tank with an outer and an inner shell where the inner shell is divided by intersecting internal walls inside the inner shell. The intersecting walls are integrally molded with undercut wall openings which allow communication of liquid and vapor between the compartments. The internal walls have to be fixed to the upper and lower walls of the tank by a suitable welding technique during the molding process. This requires a very complicated design of the molding process and it is basically impossible to produce such products by molding.

Another technique to increase the deformation stability of the fuel tank is to use means of contention around such tank. If the means are metallic the weight of the fuel system increases significantly and if the means are made of the lighter structures, the structure itself occupies a lot of space and thus again reduces the useful volume of the tank.

SUMMARY OF THE INVENTION

Accordingly, it was an object of the present invention to provide plastic fuel tanks with increased deformation stability and a process for their manufacture which overcomes the disadvantages described above for the prior art techniques.

These objects have been achieved by plastic fuel tanks in accordance with claim 1.

Preferred embodiments of the invention are set forth in the dependent claims and the detailed description following hereinafter.

The fuel tanks in accordance with the instant invention combine a satisfactory deformation resistance enabling the use of a certain pressure within the tank to suppress vapor formation with the remaining properties being practically unaffected, i.e., the tanks still fulfil all the required specifications in particular in terms of maximum deformation, impact strength etc.

The fuel tanks in accordance with the invention comprises at least two compartments, said compartments being established by a dividing wall comprising part of the upper and lower walls of the tank.

By "upper" and "lower" tank walls are designated in this specification the walls that respectively are in the upper and the lower substantially horizontal position when the fuel tank is mounted on a vehicle, while still having a lateral portion of course. These walls are generally separated by a pinch or part that was pinched between the two prints of the mold.

According to the invention, at least 20% of the dividing wall, when viewed along the contact line of said dividing wall with the tank walls, is constituted by at least one kiss point formed by welding together a multiplicity of contact points of the upper and lower walls, which may or may not be substantially in one plane relative to the planes formed by the upper and lower walls of the tank. In other terms: the kiss point(s) may be inclined relative to the tank upper and lower walls, and they may also be non planar.

By "contact line", is meant a continuous line which is drawn through the intersection of the "central surface" of the dividing wall (defined below) and the tank walls, according to the following path:

- In the kiss point areas: it goes right through the middle of said intersection i.e., right through the weld between the upper and the lower wall of the tank
- In between two neighboring kiss points: it follows the shortest line of the intersection which connects the extremity of both kiss points
- In between extreme kiss points (those closed to the pinch) and the pinch: it follows the shortest line of the intersection which connects the extremity of the kiss point and the pinch By "central surface" of the dividing wall is meant, respectively in the case where:

- there is only one, large kiss point: the plane substantially perpendicular to the bottom surface of the tank that connects the center of gravity of the kiss point to two different points of the tank pinch, and this along the main (longest) axis of the kiss point
- there are at least 2 kiss points: the surface made up by the plane(s) substantially perpendicular to the bottom surface of the tank that connect(s) the center of gravity of two neighboring kiss points of the dividing wall.

Preferably, there are at least 3 kiss points which, in order to form the dividing wall, are substantially aligned. "Substantially aligned" in this context is meant to express that the maximum value of the orthogonal distance d between the center of gravity of each kiss point and the median plane of all kiss points, should not exceed 100 mm, preferably not 50 mm. The "median plane" in this definition is meant to designate the plane substantially perpendicular to the tank bottom that minimizes the orthogonal distance between said plane and the center of gravity of all kiss points.

The "dividing walls" thus preferably comprise one large or a multiplicity of kiss points providing a non-continuous welding seam at which the upper and the lower wall are welded together at the end of the blow molding process. Hence, there is no need for preforming division walls or elements and fixing them by welding with all the risks associated therewith. Rather an "upper" and a "lower" part of the dividing wall are formed through the blow molding process. This leads to a tank structure where the said upper and lower parts of the dividing walls are an integral part of the upper and lower wall without having weak points or areas.

BRIEF DESCRIPTION OF THE DRAWINGS

FIG. 8 shows a schematic embodiment of a tank (10) including a pumping module (11) as an external functional element.

DETAILED DESCRIPTION

Figure 1:
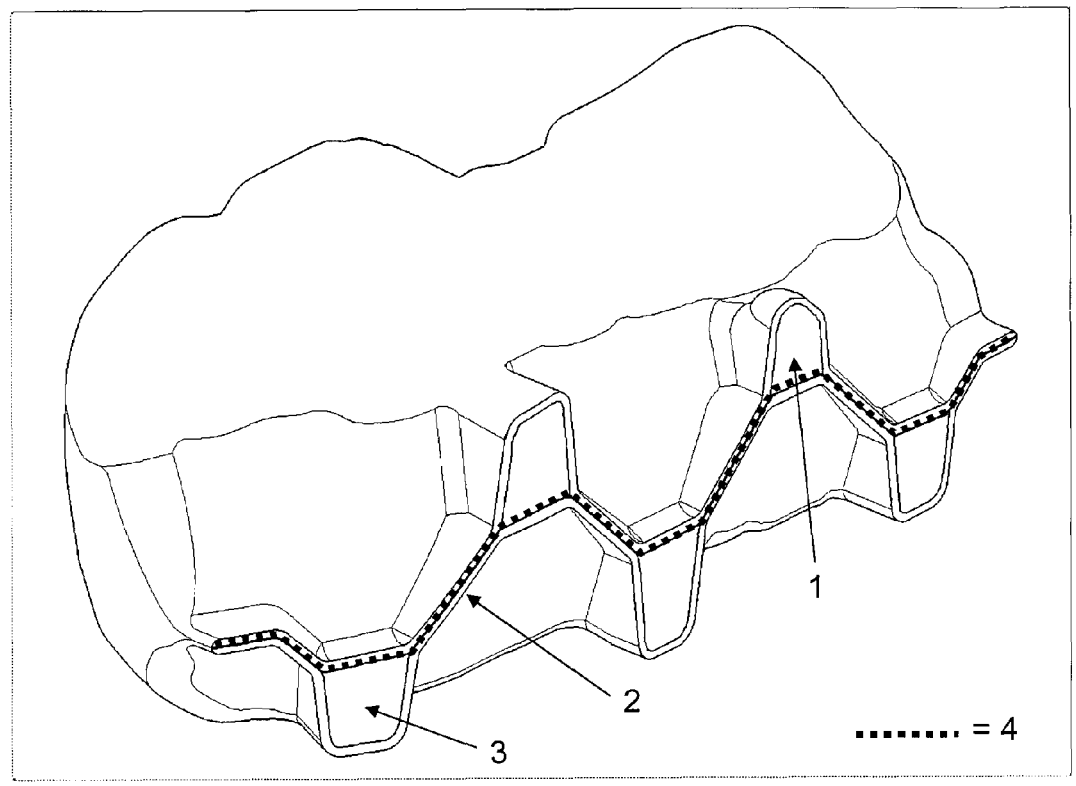
FIG. 1 shows a cross sectional view of a fuel tank in accordance with a preferred embodiment of the instant invention.

Compared to the approach in the prior art, where reinforcing means were fixed by welding inserted elements to the upper and lower wall of the tank (e.g. pillars, rods or the like) this eliminates or at least reduces the risk of creating weak areas on the upper or lower wall of the tank which could give rise to an increased deformation (and even rupture) of the upper or lower wall under load. Furthermore, producing the dividing wall as an integral step during the blow-molding of the shells facilitates the manufacture process, which is an economic advantage.

Also, compared to the use of a single kiss point of small dimensions, the invention leads to less stress concentration, since the welding areas are large and/or multiple and have to constitute at least 20% of the contact line of the dividing wall, the remaining being occupied by communication means.

Generally, the communication means are merely openings putting the compartments into communication. By "compartments" is meant, in the frame of the invention, the at least two volumes delimited by the dividing wall(s) and having communication means with one another but on less than 80% of said wall, preferably on less than 50% of said wall.

These communication means allow vapors, fuel, ventilation lines and electrical lines passing through it, placing and servicing of accessories inside of it etc.

Preferably, the communications means are distinct (one allowing preferably vapor communication and one other, preferably liquid communication) and even more preferably, they are offset when looking at them in a cut through a vertical plane comprising them i.e., one is located in the upper half of said cut (and allowing preferably for vapor communication between the compartments for all fill levels of the fuel tank) and other one, in the lower half of said cut (and allowing preferably for fuel communication between the compartments for all fill levels of the tank). By doing so, the tank of the invention can be molded directly with its compartments and this in an architecture allowing nevertheless communication both for liquid and vapor for all fill levels of the tank.

When there are more than 2 communication means, they are preferably all offset relatively to their next neighbors, i.e., there is an alternation of upper and lower communication means.

According to a preferred embodiment, the space between the upper and/or lower surface of the tank and at least one kiss point is converted into a closed volume by sealing this space with suitable means aligned with the upper or lower surface of the tank and wherein the thus created volume is connected to the interior of the tank by drilling a hole through the tank wall.

According to another preferred embodiment, the space between the upper and/or lower surface of the tank and at least one kiss point is used for the installation of external functional elements, like a pumping module for instance.

The multiplicity of contact points which are welded together to form a kiss point may be aligned in any manner relative to the plane defined by the bottom surface of the tank. According to a preferred embodiment, at least some of the contact points are aligned with a certain angle relative to the plane defined by the bottom surface of the tank. Such an inclination of at least part of the contact surfaces optimizes the useful volume of the fuel tank and for a given environment, the inclination offers a bigger contact surface between top and bottom surfaces. As a result such a configuration most probably will reduce the local stresses in and around the contact points between upper and lower surfaces of the tank. Generally said, any angle of inclination is possible, an inclination in the range of from 30 to 60°, in particular around 45° being preferred.

The cross section of the compartments of the fuel tank is not subject to specific limitations, i.e., it can be for example circular or rectangular or having any other desired shape.

The kiss point(s) do not form a continuous welding line extending from one side of the tank to the other side. Instead, each dividing wall has at least one communication means allowing vapors to flow freely between the compartments and at least one communication means to allow liquids to flow freely between the compartments of the tank. Thereby the necessary exchange between the compartments is achieved as the tank will normally only have one fuel pump, one filling neck etc., thus making a communication between the gas and the liquid phase of the compartments possible for all fill levels of the tank.

The fuel tank in accordance with the instant invention may be divided into two or more compartments, i.e., there can be more than one dividing wall as described hereinbefore. Each and every dividing wall has at least one communication means to allow liquid to flow freely into at least one other compartment and at least one communication means to allow vapors to flow freely into at least one other compartment of the tank. Overall it is necessary to design the communication means in such a manner that overall liquid fuel as well as vapors can freely flow throughout the entire volume of the tank.

Whereas there is no specific limitation concerning the positioning of the communication means in terms of distance to the upper and lower surfaces of the tank, it has proven advantageous as explained above, to have communication means for vapor exchange closer to the upper surface and to have communication means for liquid exchange closer to the bottom or lower surface of the tank.

The cross section of the communication means is not subject to any restriction, i.e., any cross section can be used.

Furthermore, also the area of the opening of the communication means is not subject to any limitations as long as the desired free flow of vapors and liquids is achieved on one hand and the desired improvement of the deformation stability is still achieved.

The dimensions of the compartments formed by the dividing means is not subject to specific limitations either; the height and length of each compartment is defined by the environment and geometry of the space where the tank is attached to the car. The width of the compartments formed, i.e., the lateral distance between a dividing wall and another dividing wall or between a dividing wall and the walls defining the outer boundaries of the tank is also not particularly limited; in many cases, however, a width of these compartments between 100 mm and 300 mm, more preferably between 150 mm and 250 mm, and ideally around 200 mm, has been proven to be advantageous because thereby a good compromise between mold design and desired deformation stability of the tank can be achieved.

In case of installation of internal functional means (fuel pump etc) it is obvious that the width of the compartments has to be sufficient to take up these internal functional means.

As explained above, the fuel tank according to the invention is made of plastic (i.e., its wall is principally made of plastic).

The term "plastic" means any material comprising at least one synthetic resin polymer.

Any type of plastic may be suitable. Particularly suitable plastics belong to the category of thermoplastics.

The term thermoplastic denotes any thermoplastic polymer, including thermoplastic elastomers as well as blends thereof. The term polymer denotes both homo- and copolymers (especially binary and ternary copolymers). Examples of such copolymers are, without being limited to, random copolymers, linear block copolymers, other block copolymers and graft copolymers.

Any type of thermoplastic polymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used, similarly it is also possible to use a blend of polymeric materials with inorganic, organic and/or natural fillers such as, for example but without being limiting: carbon, salts and other inorganic derivatives, natural or polymeric fibers. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolyzed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

The tank in accordance with the instant invention may be reinforced by the use of reinforced plastics or it may contain internal elements commonly used to integrate functional means like pumps, level indicators or the like inside the tank or e.g. means like baffles commonly used for noise reduction. Suitable concepts and processes to integrate those elements are known to the skilled man and need not to be described in detail here. Generally said an internal or external function in connection with the tank can be implemented in the manner described in the prior art to which reference is made for details at this point.

The preferred process for the manufacture of the fuel tanks in accordance with the instant invention is the blow molding process.

The manufacture of plastic fuel tanks by blow molding is well known and described manifold in the literature, to which reference is made herewith for further details. As to the manufacturing of the kiss points during the blow-molding process, these are formed by locally compressing the material of the top surface of the tank to the bottom surface of the tank during the closing of the mold so as to create a welded connection area between the two tank walls.

The plastic fuel tanks in accordance with the instant invention show low deformations, in life conditions generally below 10 mm, which is sufficient for most specifications prescribed. Due to the design of the dividing means the useful volume of the tank relative to the total volume occupied can be maximized which is an additional important advantage in view of the restricted space conditions for tank installation in most modern cars. The weight of the tank is kept low and the tank can be manufactured easily by a conventional blow molding process in an economically feasible way.

According to a preferred embodiment, the invention consists of:
 a plastic fuel tank which is partitioned into a least two compartments
 division between two compartments which is characterized by an substantial alignment of kiss points between upper and lower tank surfaces or by one large kiss point
 this alignment has at least one communication to allow vapors to freely communicate between the neighboring compartments and at least one communication to allow fuel liquid to freely communicate between the neighboring compartments
 each compartment is characterized by the following dimensions:
  the height and length of each compartment is defined by the environment in the car
  the width of each compartment is comprised between 100 mm and 300 mm, more preferred between 150 mm and 250 mm, ideally around 200 mm
  the volume of each compartment being optimized, depending on the tank material.

This invention allows an optimized positioning of the communication ports between neighboring compartments as regards tank refueling, venting, fuel delivery, gauging. . . .

It is well understood that the alignment of the kiss points is not limiting and can be modified in order to maximize the useful volume, minimize the tank deformations or allow an easier implementation of elements such as ports or filler tube, or any other interest.

The present invention is described more in detail with reference to the drawings attached which merely illustrate some preferred embodiments of said invention without limiting its scope thereto.

FIG. 1 shows a cross sectional view of a fuel tank in accordance with the instant invention. It shows cut through a dividing wall along the central surface of said tank comprising communication means for the exchange of vapor (1), kiss points (2) and communication means for the free exchange of liquid (3). These communication means are all offset relatively to their next neighbors, i.e., there is an alternation of upper (1) and lower (3) communication means.

FIG. 1 also illustrates through a dotted line, what is meant by "contact line" according to the present invention (please refer to the definition given above in the specification).

Figure 2A:
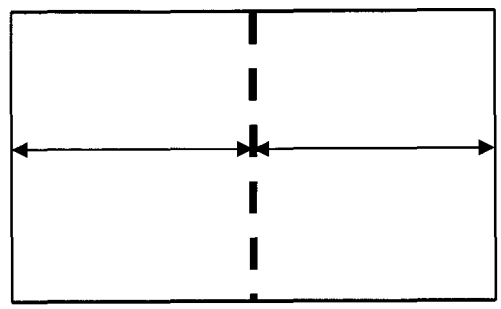
FIGS. 2a-2e and 3a-3b show different and non-limiting examples of tank partitioning (top view)
Figure 2B:
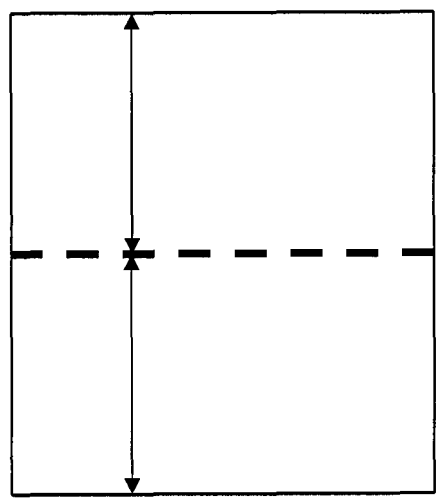

FIGS. 2a and 2b show a tank divided into at least two substantially parallelepiped compartments by dividing walls which are only schematically represented on said figures. Each compartment is substantially parallel to the others and its width is shown by an arrow.

Figure 2C:
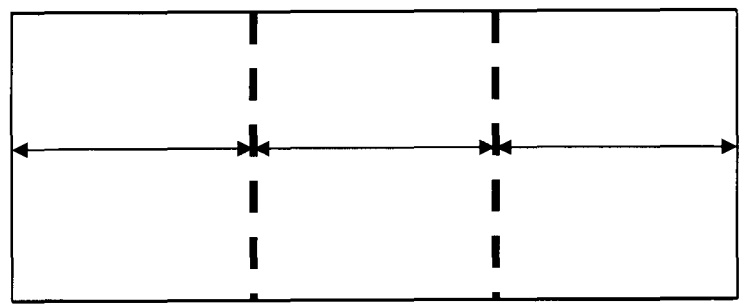
Figure 2D:
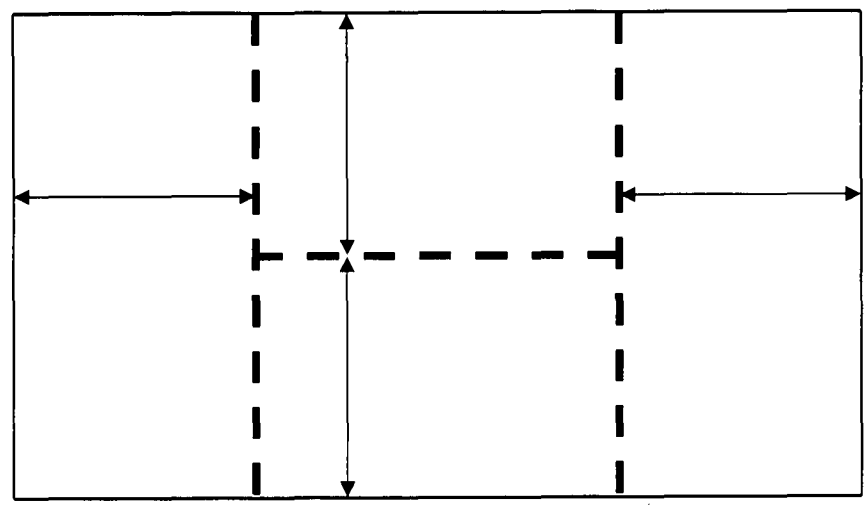
Figure 2E:
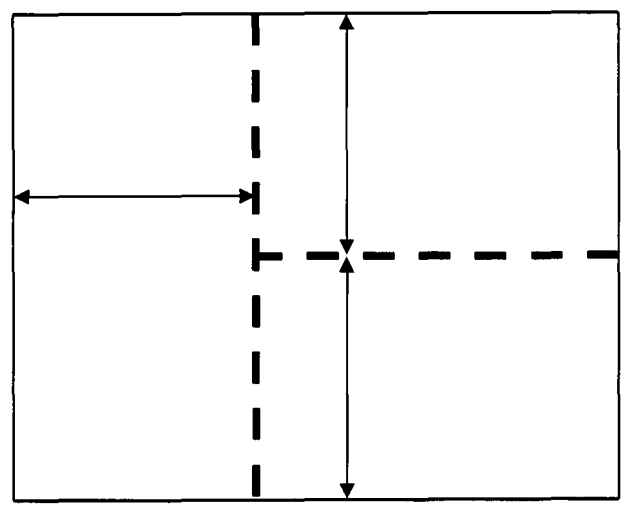

FIGS. 2c to 2e show a tank divided into at least three substantially parallelepiped compartments. At least two compartments are parallel to each other in each embodiment.

Figure 3A:
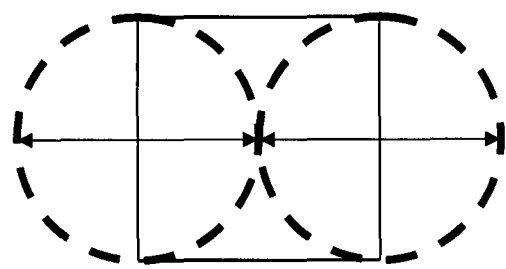
Figure 3B:
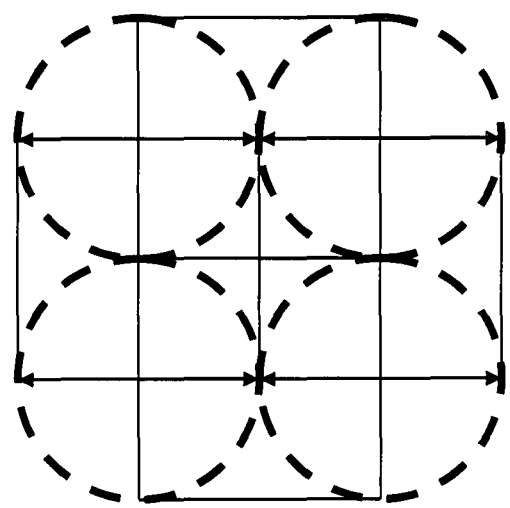

FIGS. 3a and 3b show a tank divided into at least two substantially cylindrical compartments. Those cylinders have a circular section and their axis is parallel to the bottom surface of the tank. It is well understood that, in order to limit the volume loss, compartments with substantially square sections can also be used.

Figure 4:
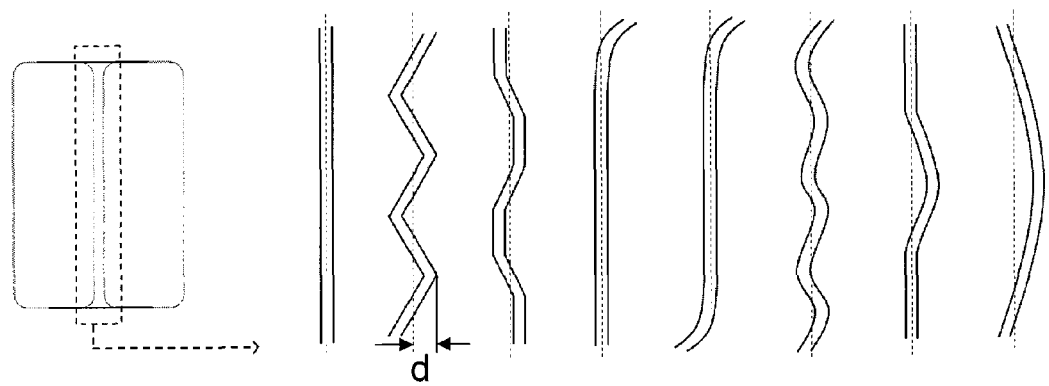
FIG. 4 shows the meaning of "aligned" as explained above in the specification.

FIG. 4 shows several examples of what is meant with the fact that the kiss points are aligned i.e., that the dividing wall between two neighboring compartments is substantially planar (linear when viewed from the top of the tank). As explained above, this means that the maximum value of the orthogonal distance d between the center of gravity of each kiss point and the median plane of all kiss points (which is viewed from the top and represented by a dotted line in FIG. 4), should not exceed 100 mm. As can be seen on FIG. 4, the kiss points may form a straight line or they can make waves or draw any kind of "line" actually when the tank is viewed from the top.

Figure 5:
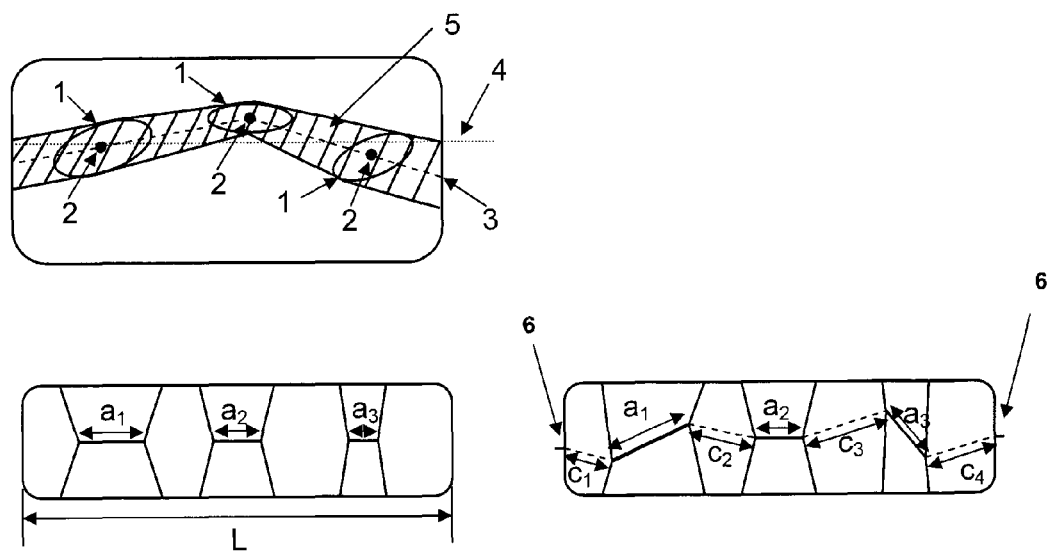
FIGS. 5 to 7 show each a top view and possible views through the central plane of the kiss point(s) as defined above, for several embodiments of the present invention.

FIG. 5 shows a tank according to an embodiment of the present invention and comprising 3 kiss points (1).

The upper figure shows a view from the top of said tank. The centers of gravity (2) of all the kiss points (1) of the dividing wall (hatched area (5)) are on the contact line (3) as defined above and said kiss points are substantially aligned as can be seen from their small distance to the median plane (indicated by dotted line (4)).

The 2 lower figures represent 2 possible views along the central plane of the kiss points. The left one shows an embodiment where the kiss points are planar and parallel to the tank upper and lower walls. According to the invention, a1+a2+a3 must be at least equal to 0.2 the length L where L is the length of the contact line. And the right one shows an embodiment where the kiss points are planar but inclined relative to the tank upper and lower walls. Again, according to the invention, a1+a2+a3 must be at least equal to 0.2 the length L, but this time, L (which must be viewed along the contact line according to the invention) is equal to c1+a1+c2+a2+c3+a3+c4.

Figure 6:
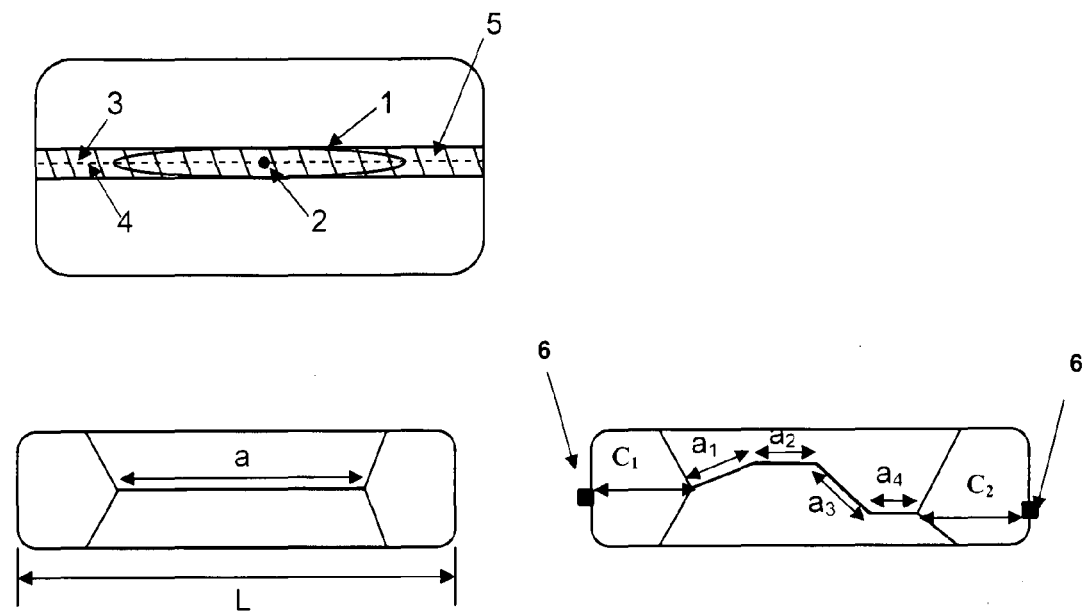

FIG. 6 shows a tank according to another embodiment of the present invention comprising only one big kiss point (1). In the sub-embodiment illustrated below left, the kiss point is planar and satisfies to the criterion a>=0.2 L. In the sub-embodiment illustrated below right, the kiss point is non planar and satisfies to the criterion c1+a1+a2+a3+a4+c2>=0.2 L.

Figure 7:
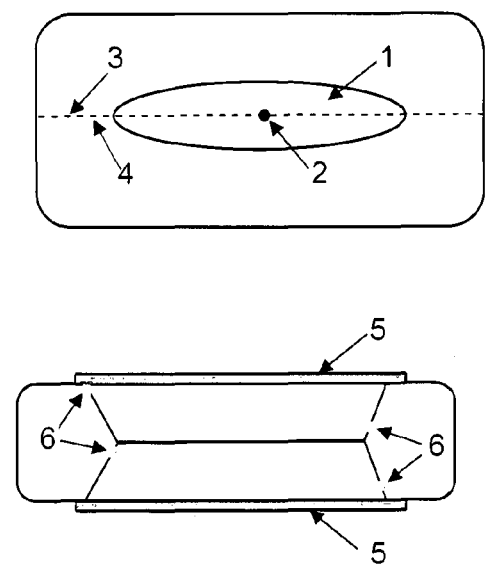

FIG. 7 shows again an embodiment with only one kiss point (1), the upper figure showing the tank as it has been blown in a top view thereof and the figure below showing a cut of said tank through the ventral plane of the dividing wall, wherein the spaces between the upper and lower surface of the tank and at said kiss point have been converted into closed volumes by sealing these spaces with plates (5) and wherein the thus created volumes are connected to the interior of the tank through holes (6) into the tank upper and lower walls.

The invention claimed is:

1. A plastic fuel tank comprising an upper wall, a lower wall and at least two compartments, said compartments being established by a dividing wall comprising a part of the tank upper and lower walls, said dividing wall having at least one communication means enabling free flow of liquids between the at least two compartments and at least one communication means enabling free flow of vapors between the at least two compartments, said communications means enabling free flow of liquids and said communication means enabling free flow of vapors occupying less than 80% of the dividing wall when viewed along a contact line of said dividing wall, the at least 20% remaining of said dividing wall being constituted by at least one kiss point formed by welding together a multiplicity of contact points of the upper and lower walls, wherein there are at least two kiss points and centers of gravity of the respective at least two kiss points are substantially aligned.

2. The plastic fuel tank according to claim 1, wherein one of the at least one communication means enabling free flow of liquids and the at least one communication means enabling free flow of vapors is located in an upper half of the tank, and wherein one other of the at least one communication means enabling free flow of liquids and the at least one communication means enabling free flow of vapors is located in a lower half of the tank.

3. The plastic fuel tank according to claim 1, wherein there are more than two of said communication means enabling free flow of liquids and said communication means enabling free flow of vapors which are all offset relatively to their next neighbors.

4. The plastic fuel tank according to claim 1, wherein a space between an upper and/or a lower surface of the tank and the at least one kiss point is converted into a closed volume by sealing the space with suitable means aligned with the upper or the lower surface of the tank, and wherein the volume is connected to an interior of the tank by drilling a hole through the upper wall or the lower wall.

5. The plastic fuel tank according to claim 4, wherein the space between the upper and/or the lower surface of the tank and the at least one kiss point is used for the installation of one or more external functional elements.

6. The plastic fuel tank according to claim 5, wherein the external functional element is a pumping module.

7. The plastic fuel tank according to claim 1, wherein the contact points of at least part of one kiss point are in a plane having an angle of inclination in a range of from 30 to 60° relative to a plane defined by a bottom surface of the tank.

8. The plastic fuel tank according to claim 1, wherein the compartments have a width in a range of from 100 to 300 mm.

9. The plastic fuel tank according to claim 2, wherein said communication means located in the upper half of the tank allows for vapor communication between the compartments for all fill levels of the fuel tank, and wherein said other communication means located in the lower half of the tank allows for fuel communication between the compartments for all fill levels of the tank.

\* \* \* \* \*